United States Patent [19]
Schneider

[11] Patent Number: 5,465,924
[45] Date of Patent: Nov. 14, 1995

[54] INERTIAL STABILIZING SYSTEM

[75] Inventor: Heinrich Schneider, München, Germany

[73] Assignee: Deutsche Aerospace AG, Germany

[21] Appl. No.: 152,000

[22] Filed: Nov. 15, 1993

[30] Foreign Application Priority Data

Nov. 14, 1992 [DE] Germany ................. 42 38 512.1

[51] Int. Cl.[6] .................................................. B64D 47/08
[52] U.S. Cl. .................. 244/118.1; 244/3.16; 248/638; 348/144; 348/208
[58] Field of Search ....................... 244/1 R, 118.1, 244/3.11; 348/638; 358/109, 222

[56] References Cited

U.S. PATENT DOCUMENTS

| | | | |
|---|---|---|---|
| 3,617,016 | 11/1971 | Bolsey | 244/3.16 |
| 4,245,254 | 1/1981 | Svensson et al. | 358/109 |
| 4,856,882 | 8/1989 | Oshima et al. | 358/222 |

Primary Examiner—Galen L. Barefoot
Attorney, Agent, or Firm—Evenson, McKeown, Edwards & Lenahan

[57] ABSTRACT

An inertial stabilizing system for a platform supported on a carrier, which is moved in a dynamically high-frequency and low-frequency manner, in which a base is arranged between the carrier and the platform which is mounted on the carrier so that it is vibration-insulated in a high-frequency manner via a damping device. On this base the platform is disposed in an adjustably movable manner by at least one control circuit which has an inertial sensor sensing the actual movements of the platform, a controller which forms an adjusting signal from the actual-desired value difference of the platform, and an adjusting device which is controlled by the adjusting signal and acts between the base and the platform. The control circuit has a further sensor which senses the low-frequency motion components of the damping device between the carrier and the base, and a control circuit element connected behind the sensor. For forming the control deviation, the control circuit element reduces the actual desired position difference in accordance with the sensor output signal, thereby considerably improving the interference and guiding behavior of the control circuit for abrupt changes of the desired value.

8 Claims, 1 Drawing Sheet

INERTIAL STABILIZING SYSTEM

BACKGROUND AND SUMMARY OF THE INVENTION

The present invention relates to an inertial stabilizing system for a platform which is supported on a carrier moved dynamically in a high-frequency and low-frequency manner, having a base which is arranged between the carrier and the platform and which is mounted on the carrier by way of a damping device in a high-frequency vibration-insulated manner, on which base the platform is arranged by at least one control circuit in an adjustably movable manner, which control circuit comprises an inertial sensor which senses the actual movements of the platform, a controller which forms an adjusting signal from the control deviation depending on the actual-desired position difference of the platform, and an adjusting device which is controlled by the adjusting signal and acts between the base and the platform.

Inertially controlled stabilizing systems, as used, for example, for sighting or imaging equipment on board a helicopter or another moving carrier structure, for the purpose of the azimuth stabilization, usually comprise a coupling network which consists of several control loops and by means of which a relatively slow azimuth drive for the rough (or coarse) adjustment of the sighting device is caused to follow a position-controlled fine drive for the platform to be stabilized, for example, a low-inertia deflecting mirror arranged in the line of sight. Stabilizing systems of this type, as known from German Patent Documents DE 31 00 951 A1, DE-OS 20 33 871, European Patent Document EP 0 256 592 A2 or European Patent Document EP 0 068 932, when the control quality is sufficient, require a very high control bandwidth and high control expenditures in order to control the low-frequency as well as high-frequency interference movements of the carrying structure. In the case of a helicopter these include the relatively slow flight path changes as well as the higher-frequency vibrations which result from the rotation of the rotor. In this case, the high-frequency and the low-frequency motion components of an inertia platform can be sensed separately from one another by acceleration sensors, see, for example, German Patent Document DE 34 33 189 A1.

In contrast, in the case of known stabilizing systems of the 0 initially mentioned type, for reasons of a constructional simplification of the control network, damping elements with a relatively soft damping characteristic are arranged between the carrying structure and the base of the stabilizing system. These damping elements absorb the higher-frequency motion components of the carrying structure so that only the low-frequency interference movements must still be controlled by the control loops and the pertaining actuating drives acting between the base and the platform. The difficulty that exists in the case of such damped systems is that the dampers have a low frequency selectivity and the reaction forces which result from the control movements of the actuating drives and react on the dampers induce an additional damper deformation and, as a result, an undesired control deviation. This undesired control deviation distorts the controller output so that positioning errors, post-vibrating of the platform in the case of a step function, and phase shifts occur in the control behavior which may drive the system into the resonance frequency. Although this effect may be attenuated by a reduction of the control amplification, this takes place at the expense of a sufficiently high control speed and thus of the control quality.

It is an object of the invention to provide an inertial stabilizing system of the initially mentioned type in such a manner that the damper-induced control errors are reduced in a constructionally simple manner and the control quality and the control speed are increased considerably.

This and other objects are achieved by the present invention which provides an inertial stabilizing system for a platform which is supported on a carrier moved dynamically in a high-frequency and low-frequency manner, comprising a base between the carrier and the platform, a damping device which connects the base to the carrier in a high-frequency vibration-insulated manner, and at least one control circuit, coupled to the platform. The platform is arranged on the base in an adjustably movable manner in response to the control circuit. The control circuit includes an inertial sensor which senses the actual movements of the platform, a controller which forms an adjusting signal from a control deviation dependent on a difference between an actual position and a desired position of the platform, and an adjusting device which is controlled by the adjusting signal and acts between the base and the platform, a further sensor which senses low-frequency motion components of the damping device between the carrier and the base and generates a corresponding output signal, and a control circuit element which is connected behind the further sensor and, for the formation of the control deviation, reduces the difference between the actual position and the desired position according to the output signal of the further sensor.

According to the invention, for reducing the damper-induced control error, it is not the control amplification and thus the control speed in general that is reduced, whereby the system would operate more sluggishly even in the case of smaller control deviations. Rather, the control gradient of the control network is modified as a function of the frequency and the amplitude of the sensed damper movements in such a manner that only when the limit frequency of the stabilizing system is exceeded, an intervention takes place into the control action according to the damper deformations generated by the control operation itself, whereas the high-frequency damper movements caused on the carrier side are without any influence on the control operation so that the control amplification is fully maintained up to an upper limit specified by the damper function. As a result, the interference effects which are caused by the system and by the low frequency selectivity of the dampers are reduced in a very simple and effective manner and a high control accuracy and control speed are ensured.

In an advantageous further development of the invention, the damper movements are scanned in a non-contact manner with a view to a low-wear construction of the sensor. In certain embodiments which have a simplified construction, the sensor comprises motion meter means sensing the damper movements and a low-pass filter which is connected behind it and which electronically filters out the higher-frequency motion components of the damping device.

In certain embodiments, a multi-axis stabilization is provided which has several sensors which sense the low-frequency motion components of the damping device in each case in different stabilization axes.

In certain embodiments, a network is used for azimuth stabilization which includes several control circuits which are coupled with one another and which has a coarse drive which follows a position-controlled fine drive, and only a single common sensor which senses the low-frequency motion components of the damping device with respect to the azimuth axis is assigned to all of the azimuth control circuits.

Other objects, advantages and novel features of the present invention will become apparent from the following detailed description of the invention when considered in conjunction with the accompanying drawings.

DETAILED DESCRIPTION OF THE DRAWINGS

Figure 1:
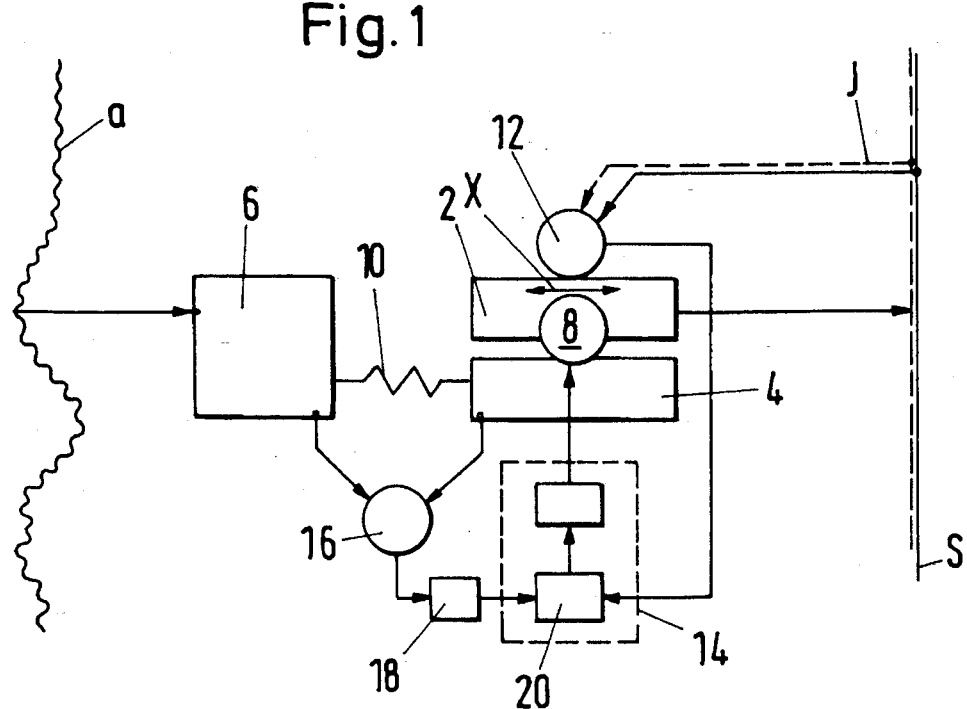
FIG. 1 is a schematic representation of the basic construction of a stabilizing system constructed in accordance with an embodiment of the present invention for the compensation of interference movements which are translational in one axis.

The stabilizing system whose basic construction is shown in FIG. 1 and has a stabilizing effect is explained below with respect to a single translational motion direction for reasons of simplicity. The stabilizing system comprises a sighting platform 2 which is supported, with the interposition of a sighting base 4, on a carrier 6, such a helicopter. The sighting platform 2 is to be held as precisely as possible in a desired position S, which is specified and which can be changed arbitrarily within predetermined limits, while not being influenced by high-frequency and low-frequency interference movements (a) of the carrier 6. These interference movements include the helicopter vibrations of, for example, 28–56 Hz, which correspond to the rotor base frequency and the higher harmonics, as well as the much slower flight path changes which take place specifically at a frequency of approximately 5 Hz.

For this purpose, the platform 2 is arranged on the base 4 so that it can be adjusted in the stabilizing direction via a drive 8. The base 4 is supported on the carrier 6 via a mechanical damping device 10 which is flexible in the stabilizing direction X and whose spring characteristic is selected to be so soft that the interference movements (a) of a high frequency which have their effect on the carrier side are absorbed by the damping device 10 so that only the low-frequency motion components of the carrier 6 are transmitted to the base 4 and the platform 2. These low-frequency motion components must be eliminated by the assigned control circuit which contains the actuating means 8 and whose sensing element comprises an inertial sensor 12 in the form of a gyroscope which feeds the difference between the desired position S and the actual position J of the platform 2 into a controller 14 which forms from the control deviation an adjusting signal which controls the drive 8 and by means of which the platform 2 is caused to follow the desired value S.

However, in the case of the above-described stabilizing system, the actual-desired position difference is influenced not only by the interference movements (a) acting on the carrier side but also, as a result of the system, by reaction forces which occur in the control system itself and which have a reaction on the damping device 10 via the base 4 when the drive 8 is started, with the result that the output signal of the inertial sensor 12 and therefore also the controller output is distorted by the resulting damper deformation. At higher control speeds, positioning errors will occur and, mainly in the case of abrupt changes of the desired value, there will be an unacceptable post-vibrating of the platform 2 and phase shifts in the control behavior which may drive the system into the resonance frequency.

In order to avoid the above, the stabilizing system according to FIG. 1 has a motion meter 16 which measures in a non-contact manner the damper movements between the base 4 and the carrier 6 and has a low-pass filter 18 which is arranged at the outlet of the motion meter 16 and which filters out the higher-frequency motion components of the damping device 10. The stabilizing system also has a control circuit element 20 which is connected behind the low-pass filter 18 and the inertial sensor 12. The low-frequency damper movements are fed to the control circuit 20 in such a manner that the difference signal of the inertial sensor 12 is reduced according to the output signal of the sensor 16, 18. Thus, in the vicinity of the limit frequency of the stabilizing system, the controller output is modified in conformity with the damper function, in such a manner that the system-caused interference effects are reduced effectively and the control quality and particularly the control speed are improved considerably.

Figure 2:
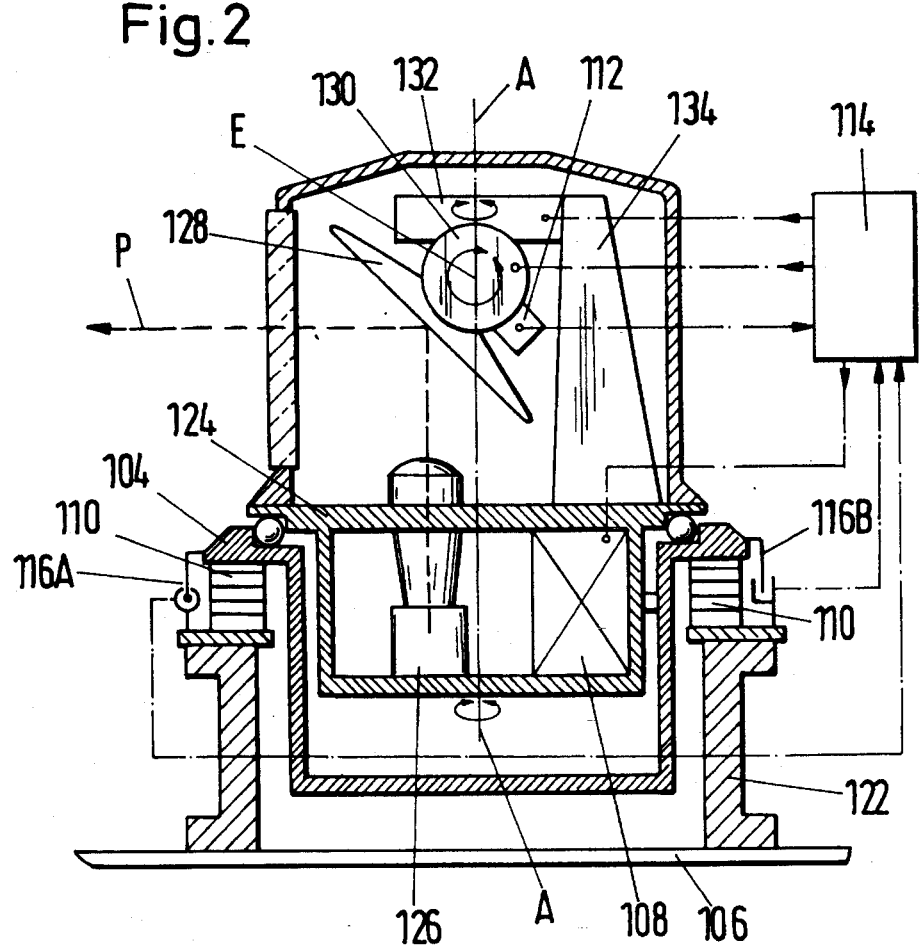
FIG. 2 is a schematic representation of a stabilizing system for a visionic device with an azimuth control and an elevation control.

FIG. 2 illustrates a stabilizing system for a visionic device which is mounted to the carrying structure 106 of a helicopter and differs from the embodiment according to FIG. 1 mainly because of a rotary stabilizing effect about the elevation axis as well as about the azimuth axis, and because of a two-circuit control of the azimuth stabilization.

Described in detail, the stabilizing system comprises a bearing block 122 which is fastened, for example, to the helicopter roof and on which a base 104 is supported by way of damping elements 110 which are flexible in the azimuth direction and in the elevation direction and absorb high-frequency vibrations. The damper movements of the damping elements 110 are measured by azimuth path meters 116A and elevation path meters 116B, respectively. On the base 104, an equipment table 124 is disposed so that it can be rotationally adjusted about the azimuth axis A by means of a coarse drive 108 along an angular range of, for example, ±120°. The equipment table 124 carries an optical imaging device 126, such as a CCD-camera, and a deflecting mirror 128 which is arranged in the optical axis P of the imaging device 126. The mirror 128 forms the position-controlled platform of the stabilizing system. Via an actuating device 130 which acts in an angular range of approximately ±20°, to rotationally position the mirror 128 about the elevation axis E, as well as via an additional azimuth drive 132 for the fine adjustment of the mirror 128 in an angular range of approximately ±1°, the deflecting mirror 128 is mounted on a supporting column 134 fastened to the equipment table 124. A two-axis inertial sensor 112 in the form of a rate gyro is coupled with the deflection mirror 128 in a manner that is fixed with respect to motion. This rate gyro 112 measures the respective position differences of the deflection mirror 128 with respect to the specified desired elevation and azimuth values.

The position difference signals of the inertial sensor 112 are fed to a controller network 114 where, analogously to the first embodiment of FIG. 1, there is a mixer stage corresponding to the control circuit element 20. The output signal of the azimuth path meter 116 A, which was separated previously from the higher-frequency motion components of the damping elements 110 in a low-pass filter, is subtracted from the azimuth difference signal from the inertial sensor 112 in such a manner that the azimuth difference signal is reduced by the sensed damper movements not before the controller limit frequency is exceeded. Thus, the maximal controller speed is limited by the damper function. From the thus formed control deviation, adjusting signals are generated in control circuits which are linked with one another by the controller 114 and which contain the drives 108 and 132. By means of these adjusting signals, the slower coarse azimuth drive 108 is caused to follow, in real time, the fast, position-limited, position controlled fine drive 132 of the deflection mirror 128.

In an analogous manner, the elevation difference signal of the inertial sensor 112 is reduced in the controller 114 according to the low-frequency elevation damper movements sensed by the path meter 116 B and an electronic low-pass filter connected behind it and, as a result, the damper function can be included in the control of the elevation drive 130. Otherwise, the construction and method of operation of the stabilizing system according to FIG. 2 is the same as in the case of the first embodiment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An inertial stabilizing system for a platform which is supported on a carrier moved dynamically in a high-frequency and low-frequency manner, comprising:

a base between the carrier and the platform;

a damping device which connects the base to the carrier in a high-frequency vibration-insulated manner; and at least one control circuit, coupled to the platform, the platform being arranged on the base and movable relative thereto in response to the control circuit, the control circuit including an inertial sensor which senses actual movements of the platform, a controller which forms an adjusting signal in response to a difference between an actual position and a desired position of the platform, and an adjusting device which is controlled by the adjusting signal and controls relative movement between the base and the platform;

wherein said control also includes a further sensor which senses low-frequency motion components of the damping device between the carrier and the base and generates a corresponding output signal, and a control circuit element which is connected to the output of the further sensor and reduces the difference between the actual position and the desired position according to the output signal of the further sensor.

2. An inertial stabilizing system according to claim 1, wherein the further sensor is coupled with the damping device in a non-contact manner.

3. An inertial stabilizing system according to claim 2, wherein the further sensor includes a path meter means which senses relative movements between the carrier and the base, and a low-pass filter connected to an output of the path meter means, the low-pass filter filtering out higher-frequency motion components of the damping device.

4. An inertial stabilizing system according to claim 3, wherein a plurality of the control circuits are provided for controlling different stabilization axes, with a sensor provided for each control circuit, said sensor measuring low-frequency motion components of the damping device about the corresponding stabilization axis.

5. An inertial stabilizing system according to claim 1, wherein for stabilizing about an azimuth axis, a plurality of mutually linked control circuits are provided, the system including a coarse azimuth drive which acts between the base and an equipment table rotatably disposed on the base, and an actuating drive which acts between the equipment table and the platform for fine stabilization of the platform, wherein the further sensor is associated to all of the control circuits, the further sensor sensing the low-frequency azimuthal motion components of the damping device.

6. An inertial stabilizing system according to claim 1, wherein the carrier is a helicopter.

7. An inertial stabilizing system for a platform which is supported on a carrier moved dynamically in a high-frequency and low-frequency manner, comprising:

a base mounted on the carrier and supporting said platform;

a high-frequency mechanical vibration absorbing element coupled between said carrier and said base;

at least one mechanical drive unit coupled between said base and said platform for adjusting position of said platform relative to said base;

at least one inertial sensor which outputs a first motion signal indicative of actual movements of said platform;

at least one low-frequency motion detector unit which outputs a second motion signal indicative of low-frequency movements of said mechanical vibration absorbing element between said base and said carrier; and a control unit which receives said first and second motion signals as inputs thereto, and forms an adjustment signal based on a difference between actual position of said platform and a desired position thereof, and reduced in response to said second motion signal, said adjustment signal being applied to control movement of said at least one drive unit.

8. An inertial stabilizing system according to claim 7, wherein said at least one low-frequency motion detector unit comprises a motion sensor and a low pass filter coupled to an output thereof.

* * * * *